(12) United States Patent
Iwase et al.

(10) Patent No.: US 7,679,252 B2
(45) Date of Patent: Mar. 16, 2010

(54) MAGNET EMBEDDED MOTOR, ROTOR UNIT, AND METHOD FOR MANUFACTURING ROTOR UNIT

(75) Inventors: Shogo Iwase, Nagoya (JP); Motohisa Ishiguro, Anjo (JP); Mitsuru Terayama, Anjo (JP); Tadashi Higuchi, Aichi-ken (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 135 days.

(21) Appl. No.: 11/397,616

(22) Filed: Apr. 5, 2006

(65) Prior Publication Data

US 2006/0273679 A1 Dec. 7, 2006

(30) Foreign Application Priority Data

Apr. 13, 2005 (JP) ............................. 2005-115639
Feb. 6, 2006 (JP) ............................. 2006-028486

(51) Int. Cl.
H02K 21/12 (2006.01)

(52) U.S. Cl. ............................. 310/156.53; 310/156.56; 310/156.05; 310/43; 310/45; 310/87; 310/88

(58) Field of Classification Search ............ 310/156.53, 310/156.56, 156.05, 42, 43, 45, 87, 88
See application file for complete search history.

(56) References Cited

U.S. PATENT DOCUMENTS

| | | | | |
|---|---|---|---|---|
| 2,696,567 A | * | 12/1954 | Madle | 310/42 |
| 4,625,392 A | * | 12/1986 | Stokes | 29/598 |
| 4,644,202 A | * | 2/1987 | Kroy et al. | 310/58 |
| 4,757,603 A | * | 7/1988 | Stokes | 29/598 |
| 4,796,354 A | * | 1/1989 | Yokoyama et al. | 29/608 |
| 4,918,831 A | * | 4/1990 | Kliman | 29/598 |
| 5,581,140 A | * | 12/1996 | Futami et al. | 310/156.53 |
| 5,864,191 A | * | 1/1999 | Nagate et al. | 310/156.54 |
| 5,864,192 A | * | 1/1999 | Nagate et al. | 310/156.05 |
| 6,008,559 A | * | 12/1999 | Asano et al. | 310/156.53 |
| 6,034,459 A | * | 3/2000 | Matsunobu et al. | 310/156.38 |
| 6,703,745 B2 | * | 3/2004 | Chu | 310/156.45 |
| 6,849,981 B2 | * | 2/2005 | Kojima et al. | 310/156.43 |
| 2003/0230948 A1 | * | 12/2003 | Murakami et al. | 310/156.53 |
| 2004/0178693 A1 | * | 9/2004 | Burgbacher | 310/217 |
| 2004/0256939 A1 | * | 12/2004 | Kim et al. | 310/156.53 |

FOREIGN PATENT DOCUMENTS

| | | | |
|---|---|---|---|
| JP | 03124238 A | * | 5/1991 |
| JP | 2000-175388 A | | 6/2000 |
| JP | 2004-48827 A | | 2/2004 |
| JP | 2004-194472 A | | 7/2004 |

* cited by examiner

*Primary Examiner*—Quyen Leung
*Assistant Examiner*—Alex W Mok
(74) *Attorney, Agent, or Firm*—Sughrue Mion, PLLC (57) ABSTRACT

A magnet embedded motor includes a rotor, a plurality of magnets embedded in the rotor, and a yoke provided with the plurality of magnets for forming a magnetic path. The rotor is formed with the plurality of magnets and the yoke in a single member by means of a resin molding by making the plurality of magnet and the yoke as an insertion body.

8 Claims, 7 Drawing Sheets

MAGNET EMBEDDED MOTOR, ROTOR UNIT, AND METHOD FOR MANUFACTURING ROTOR UNIT

This application is based on and claims priority under 35 U.S.C. § 119 to Japanese Patent Application 2005-115639, filed on Apr. 13, 2005, and Japanese Patent Application 2006-028486, filed on Feb. 6, 2006, the entire content of which is incorporated herein by reference.

FIELD OF THE INVENTION

This invention relates to a magnet embedded motor and a rotor of an inner rotor type brushless motor. More particularly, the present invention pertains to a rotor unit including a rotating body rotated by means of a rotor and method for manufacturing the rotor unit.

BACKGROUND

Conventionally, a rotating magnetic field type motor which is provided with a magnet serving as a field source at a rotor side includes a magnet embedded motor which is provided with the magnet embedded in the rotor. JP2000-175388A and JP2004-194472A respectively disclose a fixing structure of the magnet embedded motor. According to the magnet embedded motor disclosed in JP2000-175388A, a fixing spring is provided in a magnet insert hole formed on the rotor and the magnet is fixed by means of a biasing force of the spring. According to the magnet embedded motor disclosed in JP2004-194472A, the magnet is applied with an adhesive (a silicone resin based adhesive, or the like) and the magnet is thereby fixed in the magnet insert hole.

Further, JP2004-48827A (see paragraphs 25-57 and FIGS. 1-5) discloses a rotor of an interior magnet type (i.e., an inner rotor type) brushless motor. More particularly, JP2004-48827A discloses a method for assembling the rotor (i.e., a rotor unit) provided with a cooling fan for cooling the rotor and a magnet sensor for detecting rotation of the rotor used in an electrical tool or an industrial equipment, without difficulty. According to the disclosed interior met brushless motor, the rotor of the motor is rotatably supported by means of a pair of bearings fixed at a frame of the electrical tool. A rotor core having a substantially circular cross section is provided with, at a center part thereof, a rotation shaft insert hole through which a rotation shaft is extended. Further, the rotor core is provided with, at an outer circumferential side thereof, substantially rectangular magnet insert holes into which four tabular main magnets are inserted. The magnet insert holes are arranged into square. Between the rotation shaft insert holes and the mane insert holes, i.e., an inner side of vertex portions of the square, four locking holes are opened. A fan holder formed with the cooling fan is assembled to an end portion of the rotor core, the magnet insert holes of which being inserted with the magnet. The fan holder includes a flat surface which is contacted with the rotor core. Further, the fan holder includes an escape concave portion at a position corresponding to the main agent. Moreover, locking protrusions are provided which are corresponding to the locking hole. By means of the locking protrusions, the fan holder is not rotated relative to the rotor core and the main magnets are not fillen from a fan holder side.

A disk shaped sensor holder is assembled opposed to the fan holder across the rotor core. The sensor holder is provided with locking protrusions corresponding to the four locking holes. By means of the locking protrusions, the sensor holder is not rotated relative to the rotor core and the main magnets are not fallen from a sensor holder side. The magnet sensor provided with a locking mechanism is assembled relative to the sensor holder and fixed by means of thermal welding. If need arises, beings are mounted to both ends of the rotation shaft penetrating through the rotation shaft insert hole after magnetizing the magnet sensor and the main magnet. The rotor assembled in the aforementioned manner is inserted into an inner circumferential portion of a stator which is preliminarily mounted on a frame, and the bearings are fixed to the frame.

However, with the configuration of the above-described conventional magnet embedded motors, an assembling process may occasionally be complicated because of an increase of the number of components and a complexity of the structure thereof. Further, the conventional magnet embedded motor may require a lot of processes for assembling the magnet such as applying the adhesive, inserting the magnet, positioning the magnet, hardening the magnet, or the like. In consequence, the processes for assembling the magnet may harm a retention of a manufacturing cost of the magnet embedded motor and a rotor unit of the motor.

A need thus exists to provide a magnet embedded motor and a rotor unit of the motor, which can readily assembled and effectively reduced in a manufacturing cost thereof.

SUMMARY OF THE INVENTION

According to an aspect of the present invention, a magnet embedded motor includes a rotor, a plurality of magnets embedded in the rotor, and a yoke provided with the plurality of magnets for forming a magnetic path. The rotor is formed with the plurality of magnets and the yoke in a single member by means of a resin molding by making the plurality of magnet and the yoke as an insertion body.

According to an another aspect of the present invention, a rotor unit for an inner rotor type brushless motor includes a rotor, the rotor including a disk shaped yoke formed with a first hole into which a rotation shaft is inserted and a magnet embedded in the yoke along the first hole, an impeller provided at a first side of the rotor, and a plurality of bearings formed inside of the first hole which is penetrating through the rotor and the impeller, the plurality of bearings for respectively supporting the rotation shaft at a second side of the rotor and an impeller side. The rotor, the impeller, and the bearing are formed into a single member by means of a resin material.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be explained hereinbelow with reference to the attached drawings.

Figure 1:
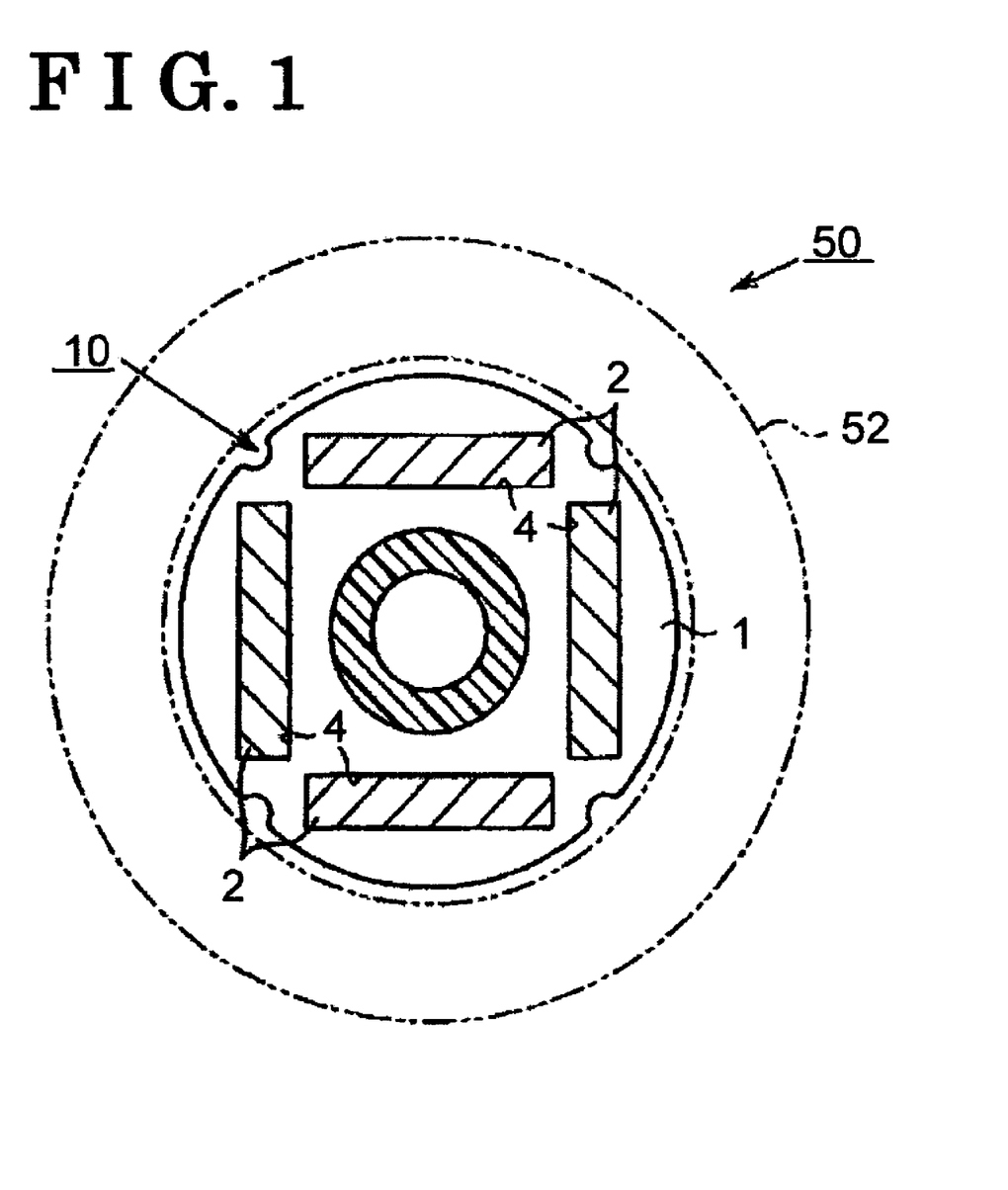
FIG. 1 is a sectional view schematically illustrating a structure of a motor.

A first embodiment of the present invention will be explained hereinafter. An interior permanent magnet motor applied to a pump apparatus (i.e., a water pump) will be explained hereinafter. With reference to FIG. 1, the motor 50 (i.e., au interior permanent magnet motor) includes a rotor 10 having plural magnets 2 which are embedded therein. The rotor 10 is provided with, at an outer side thereof, a stator 52 having a three phase (U, V, W) motor coil (not shown). A rotating magnetic field is formed and the rotor 10 upon an energization of a motor coil. Further, the rotor 10 is rotated based on a relation between magnetic field flux of the magnet 2 and the rotating magnetic field.

Figure 2:
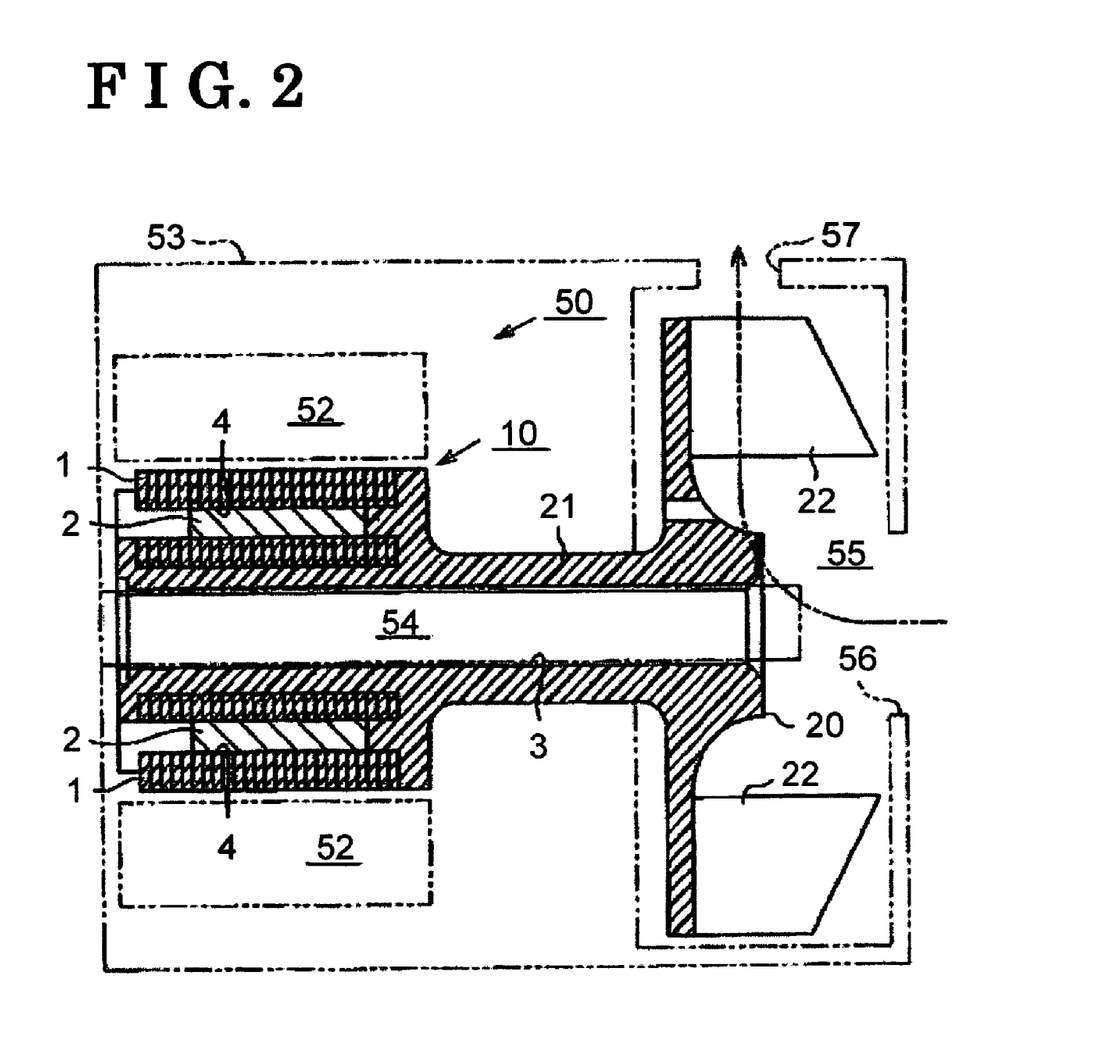
FIG. 2 is a sectional view schematically illustrating a structure of the motor and a pump apparatus.

As illustrated in FIG. 2, the rotor 10 includes a yoke 1 at which a magnetic pass of the magnet 2 is formed. The yoke 1 is formed with second holes 4 into which each magnet 2 is inserted. According to the first embodiment of the present invention, the yoke 1 is formed by laminating magnetic steel plates. Further, according to the first embodiment of the present invention, the rotor 10 includes four magnets 2, and the yoke 1 which is formed with four second holes 4 corresponding to the magnets 2 in a circumferential direction thereof in regular intervals (appox. 90 degree intervals). The rotor 10 is formed with the magnet 2 and the yoke 1 into a single member by means of an insert resin molding (i.e., an injection molding) by making the magnet 2 and the yoke 1 as an insertion body.

According to the first embodiment of the present invention, the motor 50 is a water pump motor having an impeller 20 formed with plural fin portions 22 as illustrated in FIG. 2. Further, according to the first embodiment of the present invention, the impeller 20 is formed with the rotor 10 into a single member by means of the resin molding. More particularly, with reference to FIG. 6, the impeller 20 is formed into a substantially disk shape, and each fin portion 22 is spirally formed on a surface of the impeller 20 (a surface opposed to the rotor 10). Further, the impeller 20 is coaxially connected to the rotor 10 through a substantially column shaped handle portion 21.

According to the first embodiment of the present invention, the rotor 10, the handle portion 21, and the impeller 20 are formed with a first hole 3 for inserting the rotation shaft penetrating through a central axis thereof. The rotor 10, the handle portion 21, and the impeller 20 are rotatably supported in the pump apparatus 53 (i.e., the water pump) by means of a rotation shaft 54 inserted into the first hole 3. By integrally rotating the impeller 20 arranged in a pump chamber 55 with the rotor 10, a fluid flowed into the pump chamber 55 from an inlet opening 56 is force fed to an exterior portion through an outlet opening 57.

Figure 3:
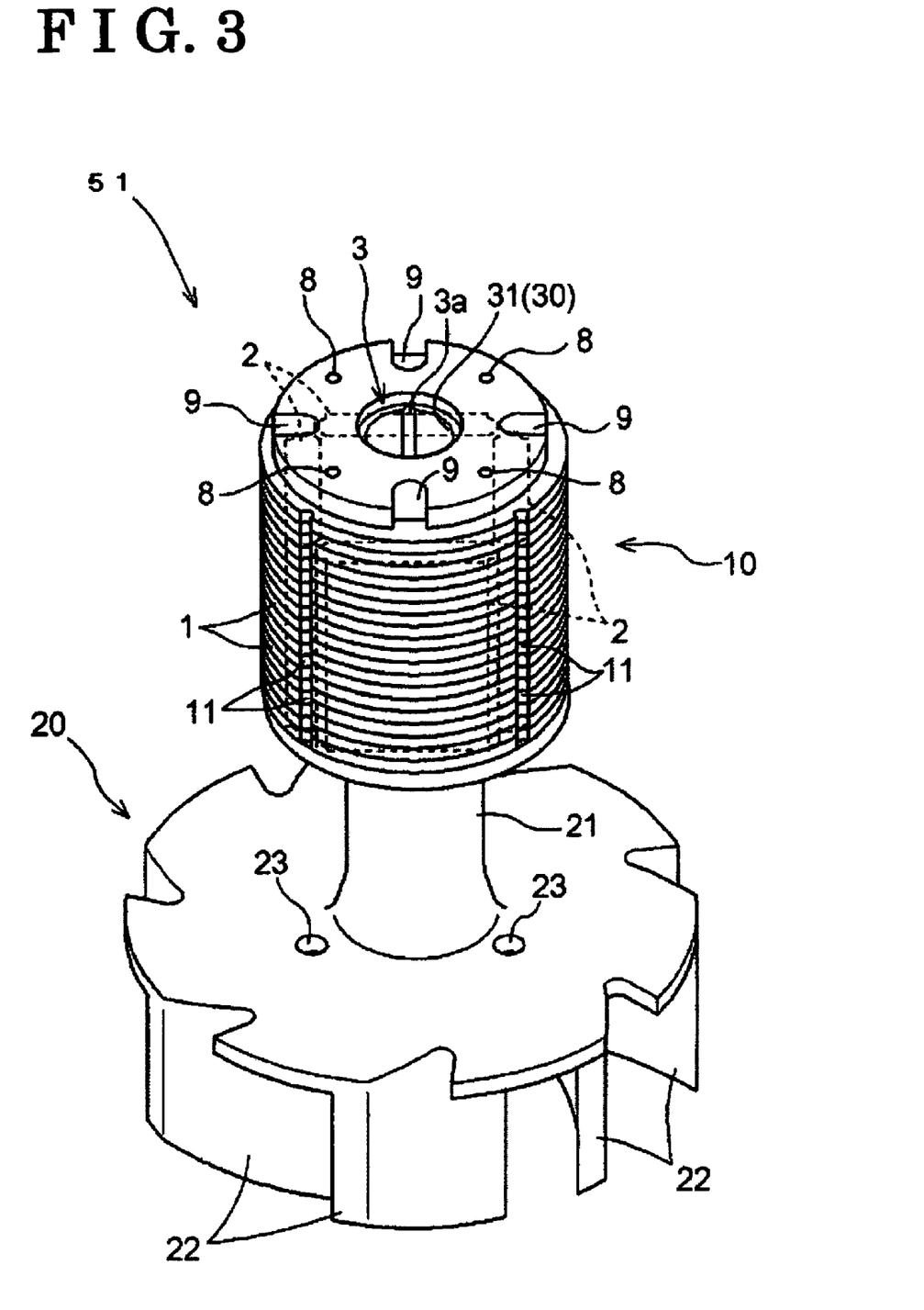
FIG. 3 is a perspective view illustrating a rotor unit according to an embodiment of the present invention.
Figure 4:
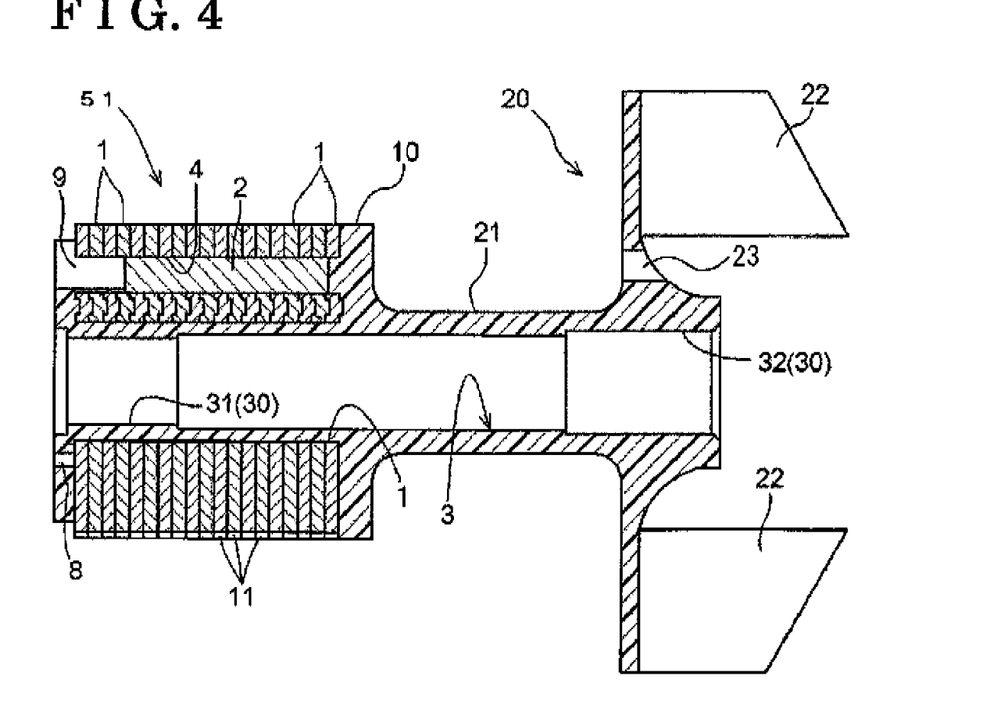
FIG. 4 is a sectional view of FIG. 3.

A second embodiment of the present invention will be explained hereinafter. With reference to FIGS. 3-4, a rotor unit 51 is formed by integrally molding the rotor 10, the impeller 20, and the bearing 30 by means of resin material. According to the second embodiment of the present invention, because the bearing 30 which is slidable relative to the rotation shaft 54 is integrally formed with the rotor 10 and the impeller 20 by means of the resin molding, a fire-retardant resin such as poly phenylene sulfide having higher burning resistance and rigidity is used for a molding resin.

The rotor 10 is provided with the impeller 20 at an end portion thereof through the handle portion 21 having a smaller diameter than that of the rotor 10. The impeller 20 integrally rotates with the rotor 10, and the fin portion 22 touches water in the water pump 53. Further, the impeller 20 includes a drain port 23.

The rotation shaft 54 is supported by means of two bearing 30 formed at both ends of an inner wall of the first hole 3. More particularly, the rotation shaft 54 is supported by means of bearings 31 and 32 formed at both ends of the rotor unit 51. The bearing 31 is formed at a first end of the rotor unit 51 (an rotor 10 side opposed to the impeller 20), and the bearing 32 is formed at a second end of the rotor unit 51 (a impeller 20 side).

Figure 5:
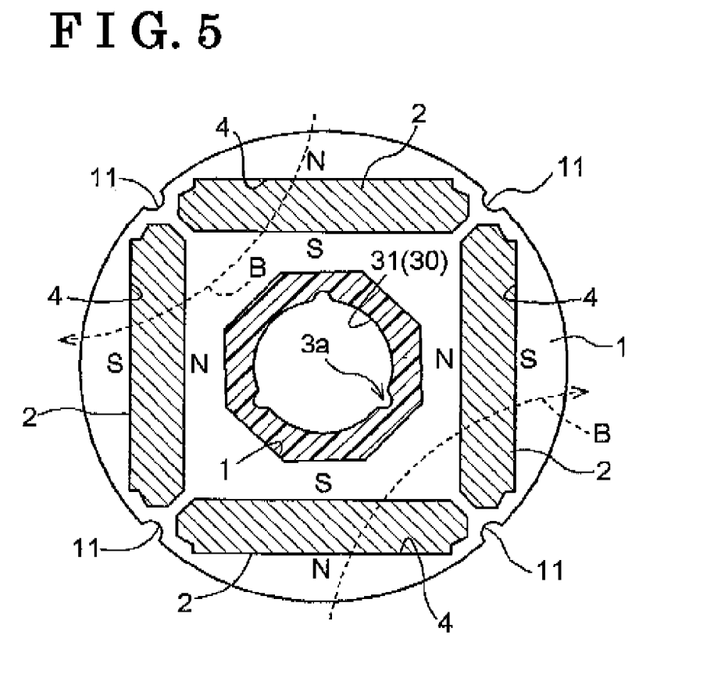
FIG. 5 is a sectional view explaining a relation between a yoke and a magnet of the rotor illustrated in FIG. 3.

With reference to FIG. 5, the yoke 1 is formed by laminating a substantially disk shaped punched plates formed with the first hole 3, the second holes 4, and side surface supporting pin holes 11 (i.e., a first pin hole). Accordingly, the yoke 1 is formed into a substantially column she having the first hole 3 at a center portion thereof, through which the rotation shaft 54 is extended.

As illustrated in FIG. 5, in a cross section of the yoke 1 perpendicular to the fist hole 3, four substantrally rectangular second holes 4 are angled into substantially square. Each one of the substantially planar magnets 2 is inserted into the corresponding second hole 4 and the magnet 2 is thereby housed in the yoke 1 along the first hole 3. With reference to FIG. 5, a cross section of the first hole 3 is formed into substantially octagon. More particularly, the octagon of the first hole 3 includes four sides facing each side of the square of the second holes 4, and four sides facing each vertex of the square. The aforementioned octagon is similar to an octagon made by cutting each vertex of the square of the second holes 4 into which the magnet 2 is arranged. Therefore, a thickness of the yoke 1 at each vertex of the square becomes greater degree than a condition where the first hole 3 includes a square shape or a circular shape as illustrated in FIG. 3. Accordingly, a thickness is ensured for magnetic flux B passing between adjacent magnets 2, and a greater degree of magnetic flux B can be passed through the yoke 1. In consequence, a function of the yoke 1 serving as a magnetic field core can be improved.

with reference to FIGS. 4-5, a pad of the list hole 3 to which the bearing 31 is provided is formed by applying the resin material at an inside thereof. The bearing 31, which is slidable with the rotation shaft 54, and the first hole 3 of the yoke 1 are required to be fixed with each other. Mote particularly, a relative rotation between the bearing 31 and the first hole 3 of the yoke 1 caused by a rotational force transmitted from the rotation shaft 54 is necessarily prevented. According to the second embodiment of the present invention, each vertex of the octagon of the first hole 3 serves as a stopper and the relative rotation between the yoke 1 and the bearing 31 is thereby prevented. Therefore, a stopper mechanism such as an opening or a protrusion is not required unlike the rotor unit disclosed in JP2004-48827.

A part of the first hole 3 to which the bearings 30 are provided is formed with a stepped portion to correspond with a rotation shaft (not shown) which is formed into a taper shape having a stepped portion. More particularly, with reference to FIG. 4, the first hole 3 is formed with the stepped portion, an inner diameter of the first hole 3 at a rotor 10 side being smaller than an inner diameter of the first hole 3 at an impeller 20 side. The rotation shaft is assembled by inserting the rotation shaft into the first hole 3 from the impeller 20 side in such a manner that a top end portion thereof having a smaller diameter is engaged with a bearing at the rotor 10 side, and a rear end portion thereof having a target diameter is engaged with a bearing at the impeller 20 side. According to the second embodiment of the present invention, the rotation shaft can readily be assembled to the bearing 30 with higher degree of accuracy.

According to the second embodiment of the present invention, an inner diameter of a part of the first hole 3, to which the bearing 30 is not provided, is not required to be formed with higher degree of accuracy because it is not contacted with the rotation shaft The first hole 3 is lengthy extended in the rotor unit 51 which is formed by means of an integral molding. Generally, such lengthy component is difficult to be formed with higher degree of accuracy. However, according to the second embodiment of the present invention, only both end portions of the first hole 3, to which the bearings 30 are provided, are required to be formed with higher degree of accuracy. In other words, a tolerance of a center part of the first hole 3 can be relaxed and a management of the tolerance becomes easier. Accordingly, a cost for manufacturing a mold can be reduced and the rotor unit 51 can be manufactured at low costs.

Generally, a mold is required to be provided with a draft angle in order to form the lengthy component such as the first hole 3. On this occasion, if he bearing 30 is also provided with the draft angle, an accuracy management relative to the rotational shaft may be greatly influenced. However, according to the second embodiment of the present invention, the center part of the first hole 3 except for the both end portions thereof can be provided with the draft angle. Accordingly, bearing 30 with higher degree of accuracy can be formed without harming productivity of the rotor unit 51.

As illustrated in FIG. 5, the inner wall of the first hole 3 is provided with a concave groove 3a along a penetrating direction of the first hole 3 for supplying lubricating water between the rotation shaft and the bearing 30. The yoke 1 is provided with, at an outer circumferential portion thereof, the substantially half circular pin holes 11 at the boundary of an adjacent magnet 2 for supporting the yoke 1 in the mold from a side surface of the yoke 1 Further, by means of the pin hole 11, a position of the magnet 2 is clearly visible from the out side of the rotor unit 51.

Normally, the magnet 2 is not magnetized at the time of inserting into the yoke 1 because the magnet 2 may be attracted relative to the yoke 1 made of iron, or the like, or may be attracted relative to the mold and an assembling performance may thereby be harmed. Further, there is a quite high possibility of demagnetization of the magnet 2 in a condition where the magnet 2 is formed by means of the resin material having a high-temperature melting point (equal to, or higher than, ca. 280 degree). Accordingly, the magnet 2 is magnetized after forming the rotor unit 51 by means of the integral molding. According to the embodiment of the present invention, because the position of the magnet 2 is clearly visible, productivity of the rotor unit 51 is improved.

Figure 8:
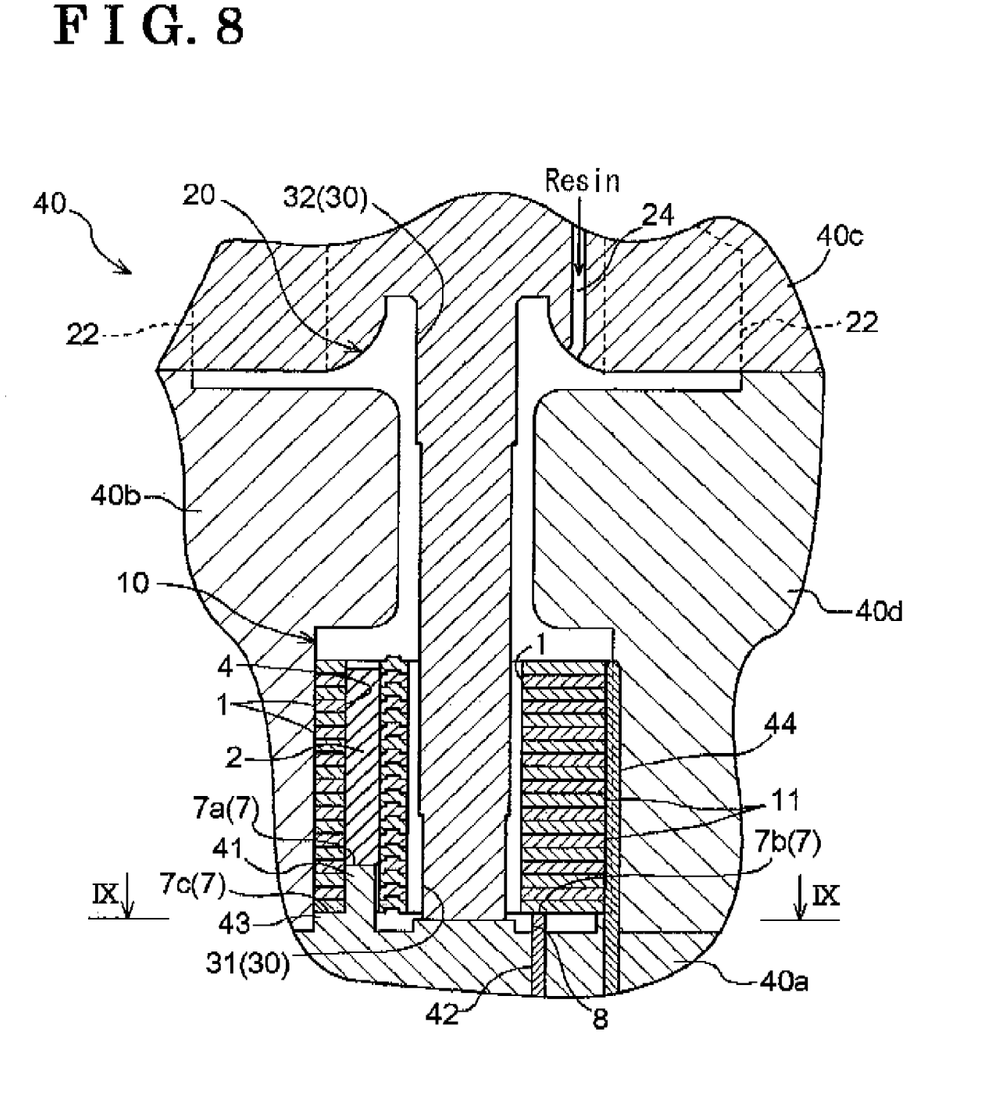
FIG. 8 is a sectional view for explaining a relation between the rotor unit illustrated in FIG. 3 and a mold.

As illustrated in FIG. 8, a mold 40 is divided into four pieces, i.e., a bottom portion 40a, a left side portion 40b, a top portion 40c, and a right side portion 40d. The rotor unit 51 is formed by injecting the resin material from a gate 24 provided at the top portion 40c of the mold 40 in a condition where the yoke 1 and the magnet 2 are arranged in the mold 40.

The yoke 1 arranged in the mold 40 is supported at the pin bole 11 by means of a side surface support pin 44 (i.e., a second pin). On this occasion, the bottom portion 40a of the mold 40 contacts with the yoke 1 and attached portions 7 of the magnet 2, and the bottom portion 40a of the mold 40 supports the yoke 1 and the magnet 2 from a lower side (first step).

Figure 6:
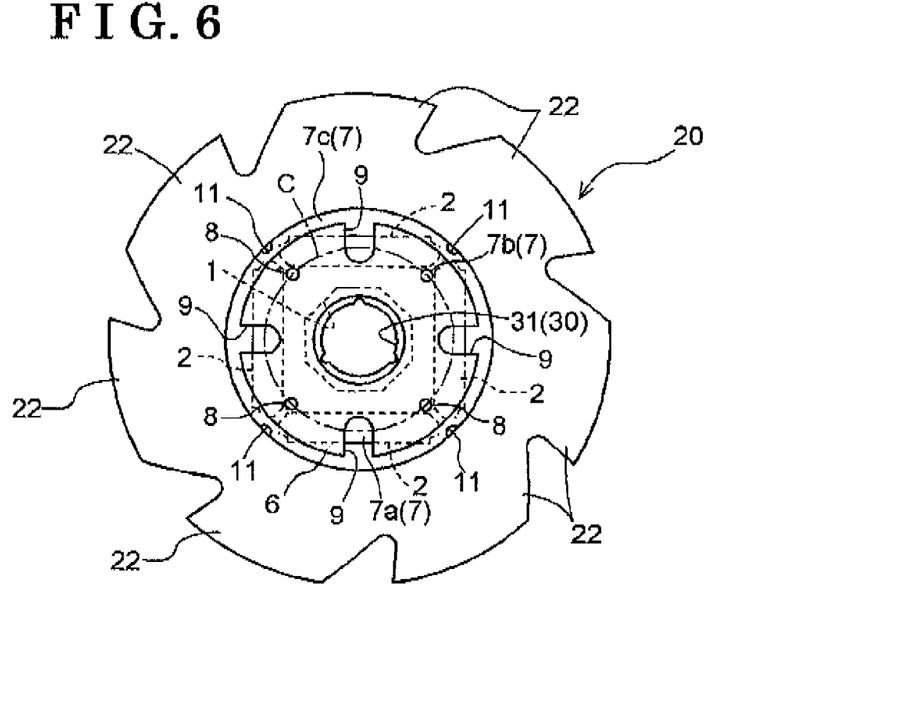
FIG. 6 is a plane view of the rotor unit illustrated in FIG. 3, viewing from an end portion at a rotor side.

As illustrated in FIG. 6, the attached portion 7 includes a first attached portion 7a, a second attached portion 7b, and a third attached portion 7c. The first attached portion 7a is placed at a position in which the magnet 2 is supported at around a center part thereof and the yoke 1 is supported at an outer circumferential side in a radial direction. The second attached portion 7b is placed at a position in which the yoke 1 is supported at the boundary of the adjacent magnet 2. The third attached portion 7c is placed at a position in which the yoke 1 is circularly supported from the outer circumferential side thereof. At a position corresponding to the second attached portion 7b, a resin portion 6 is formed which is formed in continuation from the bearing 31 for fixing the yoke 1 and the magnet 2 at an end portion of the rotor 10. Accordingly, with reference to FIG. 8, the second attached portion 7b is supported by means of a pin 42 serving as a second support portion penetrating through a pin hole 8 (i.e., a second pin hole) provided at the resin portion 6.

Figure 9:
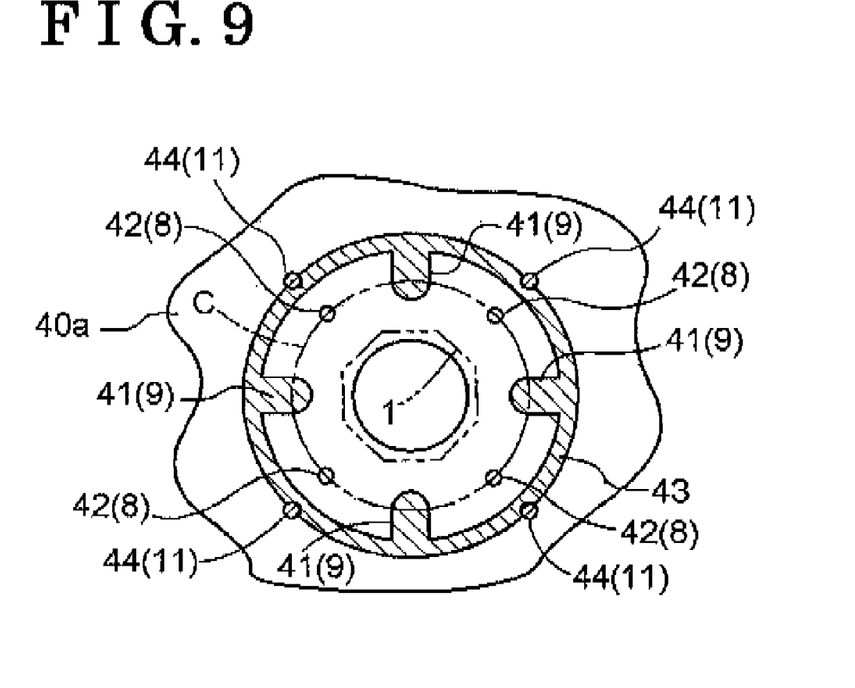
FIG. 9 is a sectional view taken along line IX-IX of FIG. 8.

With reference to FIG. 6, a center of the first attached portion 7a with a circular arc portion and a center of the substantially circular second attached portion 7b are arranged on a circumference of at identical pitch circle C. With reference to FIGS. 6 and 9, in the bottom portion 40a of the mold 40, a support portion 41 (i.e., a first support portion) contacting with the first attached portion 7a and a pin 42 (i.e., the second support portion) contacting with the second attached portion 7b are respectively arranged on the circumference of the identical pitch circle C. Accordingly, the accuracy management during manufacturing of the mold 40 (40a) can be eased. Further, a force applied to the yoke 1 because of an injection of the resin can be dispersed and a generation of a crack of the rotor 1 can thereby be prevented. With reference to FIG. 9, the third attached portion 7c of the yoke 1 is supported by means of a circular support portion 43 (i.e., a third support portion) of the bottom portion 40a of the mold 40.

With the configuration of the mold illustrated in FIG. 8, the magnet 2 may be fallen toward the bottom portion 40a of the mold 40 if the magnet 2 is not supported by means of the support portion 41 which is inserted into the second hole 4. Further, the magnet 2 may be pressed because of a pressure of the resin material until the magnet is contacted with the bottom portion 40a of the mold 40. However, according to the embodiment of the present invention, because the magnet 2 is supported by means of the support portion 41 in the second hole 4, the magnet 2 can be accurately fixed at an appropriate position by means of molding.

Because the yoke 1 and the magnet 2 are supported by means of the support portions 41-43, the rotor 10 is formed with, at an end portion thereof, the roof shaped resin portion 6 for covering the magnet 2 as illustrated in FIGS. 3 and 6. The resin portion 6 includes a cutout portion 9 and the pin hole 8.

Figure 7:
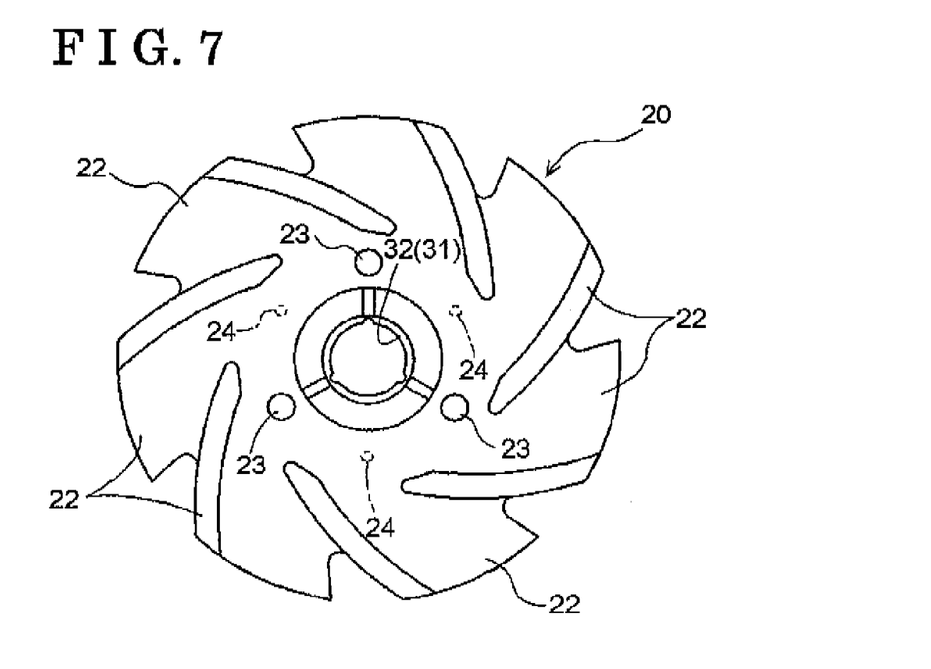
FIG. 7 is a plane view of the rotor unit illustrated in FIG. 3, viewing from an end portion at an impeller side.

The top portion 40c of the mold 40 is provided with three gates 24 corresponding to gate positions (numeral 24) illustrated by a dashed line in FIG. 7. The gate 24 serves as an inlet portion of the resin material. More particularly, the rotor 10, the impeller 20, and the bearing 30 are formed into a single member by injecting the resin material into the mold 40 from the impeller 20 side (second step). On this occasion, the yoke 1 and the magnet 2 are supported at a predeteed position by means of the support portions 41-43 against the pressure of the resin material. Accordingly, the rotor unit 51 can be accurately formed by means of the integral molding without moving its position.

Further, according to the embodiment of the present invention, the resin material is also injected to a clearance which is made between the second hole 4 and the magnet 2 for smoothly inserting the magnet 2. Accordingly, the magnet 2 is not oscillated in the second hole 4 during rotation of the rotor unit 51.

Moreover, the pin 42 for supporting the attached portion 7b also serves as a pressing pin (i.e., a pressing means) which is freely advanced and retreated. The pin 42 supports the yoke 1 at a retreated position during molding, and then the pin 42 protrudes toward the impeller 20 are the molding. Thereby, the integrally molded rotor unit 51 is pushed out of the mold (third step). Accordingly, a finished rotor unit can be demolded without difficulty.

According to the embodiment of the present invention, the motor and the rotor unit with higher degree of accuracy can be provided with a minimum assembling step.

According to the embodiment of the present invention, the rotor 10 is formed with the magnet 2 and the yoke 1 in a single member by means of the insert resin molding (i.e., the injection molding) by making the magnet 2 and the yoke 1 as the insertion body. With such configuration, the magnet 2 can be readily and reliably fixed to the yoke 1 without causing a complicated assembling process because of an increase of the number of components are a complexity of the structure. Further, an increase of the number of assembling steps such as an application of an adhesive, insertion of the magnet, positioning of the magnet, and hardening of the magnet, or the like, can be prevented In consequence, manufacturing cost of the magnet embedded motor can be effectively reduced by simplifying the assembling process of the magnet 2.

According to the embodiment of the present invention, the yoke 1 is arranged in the mold 40 in a condition where the magnet 2 is inserted in the second hole 4. Then, in a condition where the position of magnets 2 is defined by means of the mold 40, each magnet 2 is formed with the yoke 1 in a single member by means of the resin molding. With such configuration, an accuracy of a fixing position of the magnet 2 can be improved. In consequence, a torque ripple caused by an unbalance of the fixing position of the magnet 2 can be prevented and a smooth rotation of the rotor 10 can be achieved.

According to the embodiment of the present invention, the mold 40 is provided with plural support portions 41 (i.e., the first support portion) which are contacted with the magnet 2 by being inserted into the second hole 4 in a condition where the yoke 1 and the magnet 2 are arranged in the mold 40. Further, each support portion is formed on a bottom portion 40a of the mold 40 in such a manner to protrude toward a direction opposite to the injecting direction (to probate toward an upper side in FIG. 8), with such configuration, the position of the magnet 2 in the second hole 4 is stabilized because the magnet 2 is pressed toward each support portion by means of an injection pressure of the molding resin Accordingly, accuracy in arrangement of the magnet 2 can be improved.

According to the embodiment of the present invention, the motor 50 includes the impeller 20 formed with the plural fin portions 22. Further, the impeller 20 is formed with the rotor 10 in a single member by means of the resin molding. With such configuration, the number of steps for assembling the motor 50 relative to the water pump can be reduced. Further, the number of the components can be reduced. Accordingly, the reduction of the manufacturing cost of the interior magnetic motor can be achieved According to the embodiment of the present invention, the yoke., the rotor, the impeller, and the bearing are formed into a single member by means of the resin molding. With such configuration, because each component is not individually formed, positioning or fixation of each component can be performed by mans of a common mold. Generally, if the number of the components is increased, a dimensional tolerance in totality is increased because of cumulative dimensional tolerance. However, according to the embodiment of the present invention, the cumulative dimensional tolerance can be reduced. For example, misalignment between a core of the rotor and a core of the bearing can be reduced which causes uneven rotation or oscillation of the rotor.

According to the embodiment of the present invention, the yoke 1 is formed by laminating the magnetic steel plates. However, the present invention is not limited thereto. Alternatively, or in addition, the yoke 1 may be formed by compressing or sintering magnetic powder.

According to the embodiment of the present invention, the rotor 10 includes four magnets 2. However, the present invention is not limited thereto. Alternatively, or in addition, the rotor 10 may include any number of magnets 2. Further, the magnet 2 may be formed into any shape.

In the aforementioned embodiment, the present invention is applied to the motor 50 for the pump apparatus (i.e., the water pump). However, the present invention is not limited thereto. Alternatively, or in addition, the present invention may be applied to the motor of various uses.

According to the embodiment of the present invention, the rotor 10 is integrally formed with the impeller 20. However, the rotor 10 and the impeller 20 are not necessarily formed in a single member. Alternatively, or in addition, the rotor 10 may be formed of a single member by means of the rest molding.

According to the embodiment of the present invention, the rotor 10, the handle portion 21, and the impeller 20 are formed with the fist hole 3 penetrating through the central axis thereof However, the present invention is not limited thereto. Alternatively, or in addition, the present invention can be performed without the first hole 3.

Figure 10:
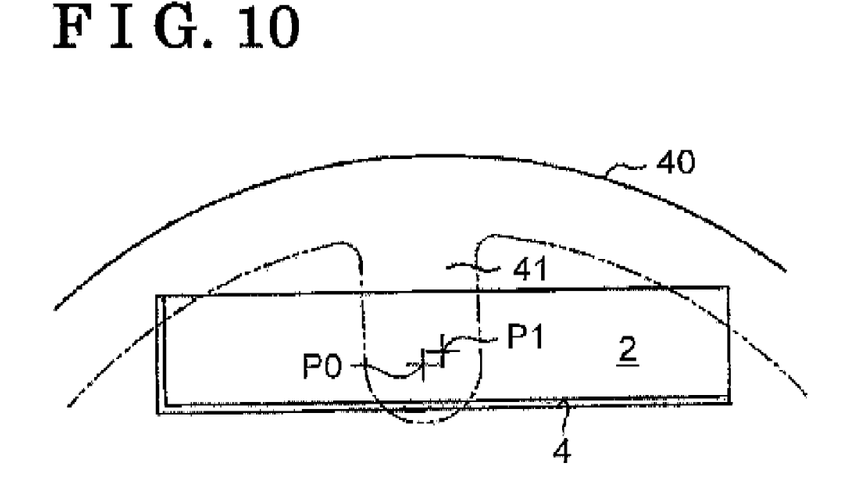
FIG. 10 is a view of a mold according to a variation of the present invention for explaining a method for forming a rotor unit according to the variation

Alternatively, or in addition, each support portion 41 may be configured in such a manner that a misalignment between the magnet 2 and the second hole 4 becomes even by means of an injection pressure of the molding resin. More particularly, with reference to FIG. 10, by actively along the misalignment between the magnet 2 and the second hole 4 and by equalizing the misalignment, generation of the torque ripple caused by the unbalance of the fixing position of the magnet 2 can be prevented and the smooth rotation of the rotor 10 can thereby be achieved. As illustrated in FIG. 10, the above described configuration can be readily realized, for example, by shifting a contact center P0 of each support portion 41 relative to each magnet 2 from a contact surface center (a center of the contact surface) P1 of each magnet 2 (in a condition where each contact surface of the support portion 41 includes a curved shape), or by inclining a contact surface of each support portion a 41 relative to the magnet 2 in the circumferential direction by a predetermined angle.

According to the embodiments of the present invention, a magnet embedded motor and a rotor unit of the motor can be provided which can be readily assembled and effectively be reduced in a manufacturing cost thereof.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claim is, be embraced thereby.

The invention claimed is:

1. A magnet embedded motor comprising:
   a rotor;
   a yoke for passing magnetic flux, the yoke provided at an end portion of the rotor and including a plurality of holes each opened at an end of the yoke;
   a plurality of magnets inserted into the holes of the yoke, respectively, each of the magnets having an axial end surface; and
   a cover member provided at the end of the yoke and including a plurality of openings provided to correspond to the plurality of magnets, respectively,
   wherein the openings open toward the respective magnets to expose the axial end surface of at least one of the magnets,
   wherein the rotor, the yoke and the cover member are formed into a single member by resin injection molding, and
   wherein the openings comprise cutout portions formed in edges of the cover member.

2. The magnet embedded motor of claim 1, wherein at least one opening is substantially aligned with the axial end surface of at least one of the plurality of magnets.

3. The magnet embedded motor of claim 1, wherein each of the openings opens toward the axial end surface of each of the magnets.

4. A rotor unit for an inner rotor type brushless motor comprising:
   a rotor;
   a cylindrical yoke for passing magnetic flux, the yoke mounted on an end portion of the rotor and including a plurality of holes each opened at an end of the cylindrical yoke;
   a plurality of magnets inserted into the holes of the cylindrical yoke, respectively, each of the magnets having an axial end surface;
   a cover member provided at the end of the cylindrical yoke and including a plurality of openings provided to correspond to the plurality of magnets, respectively,
   wherein the openings open toward the respective magnets to expose the axial end surface of at least one of the magnets;
   a through bore formed in the rotor and extending in a lengthwise direction of the rotor;
   a bearing formed inside the through bore and adapted to support a rotation shaft inserted through the through bore; and
   an impeller provided at another end of the rotor;
   wherein the rotor, the cylindrical yoke, the cover member and the impeller are formed into a single member by resin injection molding, and
   wherein the openings comprise cutout portions formed in edges of the cover member.

5. A method for manufacturing the rotor unit according to claim 4, comprising the steps of:
   inserting the yoke and the magnet into a mold;
   supporting the yoke and the magnet at a predetermined position in the mold by contacting the yoke and the magnet with the mold at attached portions respectively arranged on a circumference of an identical circle centering on the rotation shaft; and
   forming the rotor integrally with the impeller and the bearing by injecting the resin material into the mold in a condition where the yoke and the magnet are supported at the predetermined position against a pressure of the resin material.

6. A method for manufacturing the rotor unit according to claim 5, further comprises the steps of:
   pushing a finished rotor unit out of the mold by protruding a pressing means provided at the mold at least one of the attached portions toward the impeller.

7. The rotor unit of claim 4, wherein at least one opening is substantially aligned with the axial end surface of at least one of the plurality of magnets.

8. The rotor unit of claim 4, wherein each of the openings opens toward the axial end surface of each of the magnets.

* * * * *